United States Patent Office 2,991,273
Patented July 4, 1961

2,991,273
PROCESS FOR MANUFACTURE OF VACUUM MOULDED PARTS OF HIGH MOLECULAR WEIGHT THERMOPLASTIC POLYCARBONATES
Wilhelm Hechelhammer and Günter Peilstöcker, Krefeld-Bockum, Germany, assignors to Farbenfabriken Bayer Aktiengesellschaft, Leverkusen, Germany, a corporation of Germany
No Drawing. Filed July 2, 1957, Ser. No. 669,428
Claims priority, application Germany July 7, 1956
7 Claims. (Cl. 260—47)

It is known that foils and sheets of thermoplastic synthetic material such as polyamides, polyurethanes, cellulose esters, polystyrene and polyacrylic or methacrylic acid esters, may be worked up by vacuum moulding to give three-dimensionally shaped parts. Two methods of vacuum moulding are to be distinguished: the method of drawing into the negative mould (female) and the method of stretching over the positive mould (male).

The disadvantages of the thermoplastic synthetic materials most frequently processed according to the aforesaid method consists in the materials either being non-transparent such as impact-resistant polystyrene, or having a very limited plastic range such as polyamides, so that an unobjectionable vacuum moulding can only be carried out with very accurate temperature control. With deeper moulds the use of such materials is greatly limited due to the rapid cooling of the foil during the drawing process. Furthermore, with transparent thermoplastic materials such as cellulose acetate and cellulose acetobutyrate, white spots occur during the drawing, possibly because of the stretching and are orientation or by the plasticizer-content of the plastic material. It is true that other plastics such as polystyrene and polyacrylic ester are well suited for vacuum moulding and completely transparent, but they have only a slight resistance to permanent heat and impact.

The use of many thermoplastic synthetic materials is, moreover, very limited for the wrapping of food because of their inability to be sterilized.

It has now been found that foils or sheets of high molecular weight thermoplastic polycarbonates, particularly those of di-(monohydroxy arylene) alkanes, may be excellently worked up according to the known vacuum-moulding processes to yield three-dimensionally shaped parts of any type such as advertising and commercial signboards, shapes, toys of all kinds, lighting fixtures, casings, containers or all types of technical parts. The vacuum-moulding processes are fully described e.g. by Alfons Thiel in "Der Plastverarbeiter," editor Kurt Brandenburger, Speyer, 7. Jahrgang, pp. 54–56, 137–140, 269–273, 372–376, 418–420, furthermore in the monography "Grundzüge der Vacuumverformung" by Alfons Thiel, Verlag Brandenburger, Landau, 1957, and in "Kunststoffe," 1957, pp. 291–294: "Fortschritte bei der Formung Thermoplastischer Kunststoffplatten" by Gerhard Matulat.

The high molecular weight thermoplastic polycarbonates possess a very large plastic range and an excellent deep-drawing ability. The latter enables even foils of slight strength and strong stretching to give perfect shaped articles of uniform wall thickness and exact reproduction of the finest contours. Turbidity never occurs.

Three dimensionally shaped articles made of the aforesaid polycarbonates possess a very high resistance to permanent heat, complete transparency, very small water-absorption and thus small permeability to water vapors, high resistance to ageing, a good surface hardness, resistance to mineral acids even of high concentrations and to water, elasticity, impact strength and smell-resistance. They are, moreover, perfectly sterilizable, physiologically harmless and completely stain-repellent and do not contain any plasticizers.

High molecular weight thermoplastic polycarbonates according to the invention may be produced of a great number of dihydroxy compounds, that is of aliphatic, cycloaliphatic and aromatic dihydroxy compounds. For example there may be mentioned:

As aliphatic dihydroxy compounds: ethylene glycol, diethylene glycol, triethylene glycol, polyethylene glycol, thiodiglycol, ethylene dithiodiglycol, the di-, and polyglycols produced from propyleneoxide-1,2, o, m, or p-xylylene glycol, propanediol-1,3, butanediol-1,3, butanediol-1,4, 2-methylpropanediol-1,3, pentanediol-1,5, 2-ethylpropanediol-1,3, hexanediol-1,6, octanediol-1,8, 1-ethylhexanediol-1,3 and decanediol-1,10.

As cycloaliphatic dihydroxy compounds: cyclohexanediol-1,4, cyclohexanediol-1,2, 2,2-(4,4'-dihydroxydicyclohexylene)-propane and 2,6-dihydroxydecahydronaphthalene.

As aromatic dihydroxy compounds: hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2'-dihydroxydinaphthyl-1,1" and o, m, p-hydroxybenzylalcohol.

Preferred classes of aromatic dihydroxy compounds are the di-monohydroxy arylene sulphones and particularly the di-monohydroxy arylene alkanes, such as 4,4'-dihydroxydiphenylene sulphone,
2,2'-dihydroxydiphenylene sulphone,
3,3'-dihydroxydiphenylene sulphone,
4,4'-dihydroxy-2,2'-dimethyl-diphenylene sulphone,
4,4'-dihydroxy-3,3'-dimethyl-diphenylene sulphone,
2,2'-dihydroxy-4,4'-dimethyl-diphenylene sulphone,
4,4'-dihydroxy-2,2'-diethyldiphenylene sulphone,
4,4'-dihydroxy-3,3'-diethyldiphenylene sulphone,
4,4'-dihydroxy-2,2'-di-tert. butyl-diphenylene sulphone,
4,4'-dihydroxy-3,3'-di-tert. butyl-diphenylene sulphone
and 2,2'-dihydroxy-1,1'-dinaphthylene sulphone,
furthermore 4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy - diphenylene) - (4-methyl-phenylene)-methane,
(4,4' - dihydroxy - diphenylene) - (4-ethyl-phenylene)-methane,
(4,4'-dihydroxy-diphenylene) - (4-isopropyl-phenylene)-methane,
(4,4'-dihydroxy - diphenylene) - (4-butyl - phenylene)-methane,
(4,4'-dihydroxy-diphenylene)-benzyl-methane,
(4,4'-dihydroxy-diphenylene)-α-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2-(4,4'-dihydroxy-diphenylene)-heptane (boiling point 198–200° C. under 0.3 mms. mercury gauge).
2,2-(4,4'-dihydroxy-diphenylene)-octane,
2,2-(4,4'-dihydroxy-diphenylene)-nonane (melting point 68° C.),
1,1-(4,4'-dihydroxy-diphenylene)-1-phenyl-ethane,
(4,4'-dihydroxy-diphenylene)-1-(α-furyl)-ethane, 3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy - diphenylene) - dekahydronaphthalene (melting point 181° C.)
2,2-(4,4'-dihydroxy-3,3'-dicyclohexyl-diphenylene) - propane (melting point 144–146° C.)
2,2 - (4,4'-dihydroxy-3-methyl - diphenylene) - propane (melting point 114° C.),
2,2-(4,4'-dihydroxy-3-isopropyl-diphenylene)-butane,
1,1-(4,4'-dihydroxy - 3,3'-dimethyl-diphenylene) - cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane,
1,1-(4,4'-dihydroxy-3,3'-dimethyl - 6,6'-dibutyl-diphenylene)-butane,
1,1-(4,4'-dihydroxy - 3,3' - dimethyl-6,6'-di-tert. butyl-diphenylene)-ethane,
1,1-(4,4'-dihydroxy - 3,3' - dimethyl-6,6' - di-tert. butyl-diphenylene)-propane,
1,1 - (4,4'-dihydroxy - 3,3' - dimethyl-6,6' - di-tert. butyl-diphenylene)-butane,
1,1 - (4,4'-dihydroxy - 3,3' - dimethyl-6,6'-di-tert. butyl-diphenylene)-isobutane,
1,1 - (4,4'-dihydroxy - 3,3'-dimethyl-6,6'-di-tert. butyl-diphenylene)-heptane,
1,1 - (4,4'-dihydroxy-3,3' - dimethyl - 6,6'-di-tert. butyl-diphenylene)-1-phenyl-methane,
1,1 - (4,4'-dihydroxy-3,3' - dimethyl - 6,6' - di-tert. butyl-diphenylene)-2-methyl-2-pentane,
1,1 - (4,4'-dihydroxy-3,3' - dimethyl-6,6' - di-tert. butyl-diphenylene)-2-ethyl-2-hexane, and
1,1 - (4,4'-dihydroxy - 3,3' - dimethyl-6,6'-di-tert-amyl-diphenylene)-butane.

Among the great number of suitable di-monohydroxy arylene alkanes the 4,4'-dihydroxy-diphenylene alkanes are preferred, especially the 2,2-(4,4'-dihydroxy-diphenylene)-propane and the 1,1-(4,4'-dihydroxy-diphenylene)-cyclohexane.

In some cases mixed polycarbonates prepared of at least two different dihydroxy compounds, especially such of at least one aromatic and at least one aliphatic dihydroxy compound, yield foils with special properties.

In general it is advantageous that the polycarbonates have a relatively high molecular weight, they should have a K-value of at least 50 measured in a 0.5 percent solution in methylene chloride, especially a value from about 50 to about 65.

The high molecular weight thermoplastic polycarbonates may be produced by re-esterifying a dihydroxy compound of one of the groups mentioned above or a mixture of such dihydroxy compounds with a di-ester of carbonic acid, e.g. with the dimethyl-, diethyl-, dipropyl-, di-butyl-, di-amyl-, dioctyl-, dicyclohexyl-, and especially with the diphenyl- and di- o, m, or p-toluyl carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl- o-, m-, or p-toluyl and the cyclohexyl-phenyl carbonate, particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

As di-esters of carbonic acid there also may be used dialkyl-, dicycloalkyl- or diarly-dicarbonates of aromatic dihydroxy compounds, especially of di-monohydroxy arylene alkanes. Such mixed bis-carbonates of dihydroxy compounds may be heated alone while the corresponding carbonic acid diester splits off. They also may be heated in mixtures with the dihydroxy compounds referred to.

The aforementioned dicarbonates of the aromatic dihydroxy compounds are easily obtainable e.g. by reacting the sodium salt of the aromatic dihydroxy compounds with 2 mols of an alkyl-, cycloalkyl-, or aryl-chlorocarbonate. Thus for example one obtains by reacting the sodium salt of 2,2-(4,4'-dihydroxy-diphenylene)-propane with phenyl chlorocarbonate in aqueous alkali medium, the bisphenyl carbonate of 2,2-di-(p-hydroxyphenylene)-propane, having the melting point 102–104° C., in practically quantitative yield.

For carrying out the process the following carbonates of aromatic dihydroxy compounds are suitable: bis-alkyl, e.g. bis-ethyl, bis-propyl, bis-isopropyl, bis-butyl, bis-amyl, bis-hexyl, bis-cycloalkyl, e.g., bis-cyclohexyl and bis-methylcyclohexyl, and bis-aryl, e.g. bis-phenyl, bis-cresyl, bis-cyclohexylphenyl and bis-naphthyl carbonates of resorcinol, hydroquinone, 2,4-dihydroxytoluene, 2,5-dihydroxytoluene, 3,5-dihydroxytoluene, 4,4'-dihydroxydiphenyl 2,4'-dihydroxydiphenyl, 4,4'-dihydroxy-3-cyclohexyl-diphenyl, 1,4 - dihydroxynaphthalene, 1,6 - dihydroxynaphthalene, 2,6-dihydroxynaphthalene, 1-5-dihydroxyanthracene and of di-(mono-hydroxy arylene)-alkanes, in particular the 2,2-[diphenyl-(diphenylene)-dicarbonate]-propane. Mixtures of bis-carbonates of the dimonohydroxyarylene alkanes with monohydroxy compounds can also be used.

By heating these bis-alkyl, -cycloalkyl, or -aryl carbonates of the aromatic dihydroxy compounds, preferably under reduced pressure, one obtains, with separation of neutral alkyl, cycloalkyl, or aryl carbonates, a high molecular weight polycarbonate. If the said compounds are mixed with a dihydroxy compound, high molecular weight polycarbonates are obtained by inter-esterification. If, for example, one mol of the bis-phenyl carbonate of 2,2-di-(p-hydroxyphenylene)-propane is inter-esterified with one mol of 2,2-di-(p-hydroxyphenylene)-propane itself, the polycarbonate of the 2,2-di-(p-hydroxyphenylene)-propane is obtained accompanied by separation of phenol. This process has the advantage that the quantity of phenol split off per unit weight of polycarbonate formed is less than in other inter-esterification processes.

The re-esterifying process has to be conducted while excluding oxygen. We prefer to pass an inert-gas such as hydrogen, nitrogen, or carbon dioxide gas through the melt.

The re-esterification may be activated by re-esterifying catalysts, such as inorganic bases, for example caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminium oxide, lead oxide, antimonotrioxide, cerium oxide, and boron oxide, acids, such as phosphoric acid and p-toluene sulphonic acid, and salts, such as sodium benzoate, calcium acetate, and boron phosphate, and alcoholates and phenolates.

When using basic catalysts mentioned above in the resterifying process it is advantageous to neutralize these basic catalysts towards the end of the esterification by adding base-binding materials to the melt. For this purpose a large variety of base-binding organic or inorganic substances can be added e.g. aromatic sulphonic acids such as p-tolyl sulphonic acid, organic acid halides such as stearyl chloride, butyryl chloride, benzoyl chloride, and toluene sulphochloride, organic chlorocarbonates such as phenyl chloroformate, p-hydroxy-diphenyl chloroformate, and bis-chloroformates of di-monohydroxy arylene alkanes, dialkylsulphates such as dimethyl sulphate and dibutyl sulphate, organic chlorine compounds such as benzoyl chloride and ω-chloroacetophenone as well as acid salts of polycondensation inorganic acids such as ammonium hydrogen sulphate.

Base-binding substances which are volatile under greatly reduced pressure at esterification temperatures are especially suitable since an incidental excess over that required to neutralize the basic catalysts can be easily removed from the melt. Dimethyl sulphate, phenyl-chloroformate and benzoyl chloride are examples of substances of this group.

After the neutralization of the catalysts, the interesterification can if necessary be further continued to a limited extent for the attainment of a desired molecular weight.

The polycarbonates can also be produced by introducing phosgene into solutions of dihydroxy compounds or of mixtures of the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylene-chloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and evenutally the produced polycarbonate.

The reaction conditions should be so that one mol of the phosgene reacts with one mol of the dihydroxy compounds. Suitable temperatures are from about 0° C. to 100° C.

Finally it is also possible to react bis-chloro-carbonates of dihydroxy compounds, with the aforementioned dihydroxy compounds. The condensation proceeds suitably in the presence of inert solvents, and acid-binding materials, e.g. tertiary amines.

When using phosgene or bis-chlorocarbonic acid esters as derivatives of the carbonic acid in producing polycarbonates catalysts also may be advantageous. Such catalysts are for instance tertiary or quaternary organic bases or salts thereof, such as trimethylamine, triethylamine, dimethylaniline, diethylaniline, dimethylcyclo-hexylamine, and pyridine, or for instance the corresponding hydrochlorides, and tetramethylammoniumhydroxide, triethyloctadecylammoniumchloride, trimethylbenzylammoniumfluoride, triethyl-benzylammoniumchloride, dimethyldodecylammoniumchloride, dimethylbenzylphenylammoniumchloride, trimethylcyclohexylammoniumbromide, and N-methylpyridiniumchloride, in amounts from about 0.05 to about 5 percent by weight. These compounds may be added to the reaction mixture before or during the reaction.

Furthermore in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, also, act as such surface active agents.

In the production of polycarbonates according to the various processes it further is advantageous to employ small amounts of reducing agents, for example sodium or potassium sulphide, sulphite, and dithionite, or free phenol and p-tert, butyl-phenol.

By adding monofunctional compounds which are capable of reaching with phosgene or with the end groups of the polycarbonates consisting of the chlorocarbonic acid ester group and which terminate the chains, such as the phenols, for instance, phenol, tert. butylphenol, cyclohexylphenol, and 2,2-(4-hydroxyphenylene-4'-methoxyphenylene)-propane, as well as aniline and methylaniline, it is possible to regulate the molecular weight of the polycarbonates within wide limits.

Typical processes for preparing high molecular weight polycarbonates mentioned above are described in the following examples. The parts are by weight.

*Example 1*

A mixture of:

45.6 parts of 2,2-di-(p-hydroxyphenylene)-propane,
47.1 parts of diphenylcarbonate, and
0.008 part of lithium hydride, is melted together under a nitrogen atmosphere with stirring at 110–150° C. The phenol which separates is distilled off by further heating to 210° C. under a pressure of 20 mms. mercury gauge. The pressure is then reduced to 0.2 mm. mercury gauge and the temperature raised for one hour to 250° C., and for two further hours to 280° C. At the end of the condensation the catalyst is neutralized by stirring 0.05 parts of dimethylsulphate into the melt. The excess of neutralizing agent is finally removed by further heating under reduced pressure. A viscous melt is obtained which solidifies to a thermoplastic material melting at 240° C.

A mixture of 46.8 parts of bis-(phenylcarbonate) of 2,2-di-(p-hydroxyphenylene)-propane, 0.008 part of calcium hydride and 0.008 part of sodium benzoate is melted together under nitrogen and with stirring. The diphenyl carbonate split off is distilled off at 200° C. under a pressure of 2 mms. mercury gauge. After further heating to 280° C. at a pressure of 0.2 mm. mercury gauge the alkali catalyst is neutralized by stirring in 0.05 part of dimethyl sulphate. The mixture is then stirred for a further half an hour at 280° C. at 0.2 mm. mercury gauge pressure, whereby the excess of dimethyl sulphate is removed and a colourless high molecular weight thermoplastic polycarbonate is obtained which softens at about 230° C.

*Example 3*

Into a mixture of 137.6 parts of 2,2-(4,4'-dihydroxy-diphenylene)-propane, 66.9 parts of caustic soda, 615 parts of water, 330 parts of methylenechloride, 0.12 part of sodium dithionite, and 0.1 part of p-tert.-butylphenol, 71.5 parts of phosgene are introduced with stirring at about 25° C. during two hours. Then 3 parts of triethylbenzylammoniumchloride are added while continuing stirring the mixture at room temperature for about 2 hours. After this time the solution of the polycarbonate in the methylenechloride is highly viscous. The mixture is then washed with water and upon evaporating the solvent from the washed material a colourless, elastic plastic material is obtained. The K-value is 63.0 corresponding to an average molecular weight of 45,000. The theoretical average molecular weight is 47,700.

*Example 4*

To a mixture of 19.65 parts of 1,1-(4,4'-dihydroxy-diphenylene)-cyclohexane- bis-chlorocarbonic acid ester and 12.86 parts of 1,1-(4,4'-dihydroxy-diphenylene)-cyclohexane dissolved in 350 parts of methylene chloride there is added drop by drop with stirring a solution of 11.85 parts of pyridine in 55 parts of methylene chloride at 0° C. over a period of 60 minutes. After the mixture is stirred at room temperature for several hours it is shaken out with water and dried. After evaporation of the solvent there remains a colourless clear tough plastic material with a softening point of 180° C.

Further special examples for producing high molecular weight thermoplastic polycarbonates are given in copending applications Serial No. 461,938, filed October 12, 1954, No. 557,256, filed January 4, 1956, No. 572,793, filed March 21, 1956, No. 572,802, filed March 21, 1956, No. 596,398, filed July 9, 1956, Patent No. 2,946,766 and No. 614,340, filed October 8, 1956.

The foils suitable for the production of shaped parts according to the invention may be produced by methods known in the art per se. The polycarbonate may be melted and the melt may be blown or cast to be the foils e.g. by means of an extruder with a wide-slit nozzle, or the polycarbonate may be dissolved in an organic solvent and this solution cast to form foils.

However for the present invention it is essential that the polycarbonate is dried to an extremely high degree before being worked up. It should have a water content not higher than about 0.05 percent. Therefore it is desirable to preheat the polycarbonate for instance in the form of a granulate for some hours at temperatures between about 80 and about 120° C. in a gas stream or under reduced pressure, particularly lower than one millimetre mercury gauge.

When casting the foils from the melt for example by means of an extruder it is furthermore advantageous to produce a relatively high pressure upon the melt, so that the gas-bubbles that eventually rise in the melt are pressed out. Thus the pressure upon the melt before the nozzle should be at least 50 atmospheres. In general suitable pressures lie between about 70 and about 150 atmospheres.

When casting the foils from a polycarbonate solution the process should be carried out in an atmosphere as dry as possible to prevent the foils from becoming opaque.

The following examples are given for the purpose of illustrating the invention.

*Example 5*

A foil of poly-2,2-(4,4'-diphenylene)-propane carbonate of K-value of about 55 and a thickness of 0.2 millimetre is heated on a vacuum deep-drawing apparatus by infrared irradiation until the desired plasticity is reached and then shaped in a stretching process to give a face mask. The mask having uniform wall strength and complete transparency shows an exact reproduction of the finest contours.

*Example 6*

A foil of poly-2,2-(4,4'-diphenylene)-propane carbonate having a K-value of about 60 and a thickness of 0.5 millimetre is heated on a vacuum deep-drawing apparatus by infrared irradiation until the desired plasticity is attained and shaped in a stretching process to give a cylindrical container having a depth of about 5 centimetres and a diameter of 12 centimetres. The container having a uniform wall strength and complete transparency shows a high impact strength and elasticity.

We claim:

1. In the process of manufacturing faithfully molded impact-resistant plastic articles, the steps of providing a sheet of resinous thermoplastic linear polycarbonate of a di-monohydroxyarylene alkane, said sheet containing less than 0.05% water and said polycarbonate having a K-value of at least 50 measured in a 0.5% solution in methylene chloride, heating the sheet until it reaches a molding plasticity, and then vacuum molding the heated sheet.

2. The combination of claim 1 in which the resin is free of plasticizer.

3. The combination of claim 1 in which the heating is effected by infrared irradiation.

4. The combination of claim 1 in which the K-value, measured in a 0.5% solution in methylene chloride, is not higher than 65.

5. The combination of claim 1 in which the polycarbonate is a polycarbonate ester of di-parahydroxy phenylene alkane.

6. The combination of claim 1 in which the polycarbonate is a polycarbonate of 2,2-bis-(parahydroxy phenylene)-propane.

7. The combination of claim 1 in which the polycarbonate is a polycarbonate of 1,1-bis-(parahydroxy phenylene)-cyclohexane.

References Cited in the file of this patent

FOREIGN PATENTS

| | | |
|---|---|---|
| 13,040 | Germany | June 21, 1956 |
| 546,375 | Belgium | Mar. 23, 1956 |
| 546,376 | Belgium | Mar. 23, 1956 |
| 546,377 | Belgium | Mar. 23, 1956 |

OTHER REFERENCES

Chemical Week, pp. 96–100, Apr. 6, 1957, Thompson et al. Modern Plastics, pp. 135, 136 and 138 (April 1958).